Figure 1:
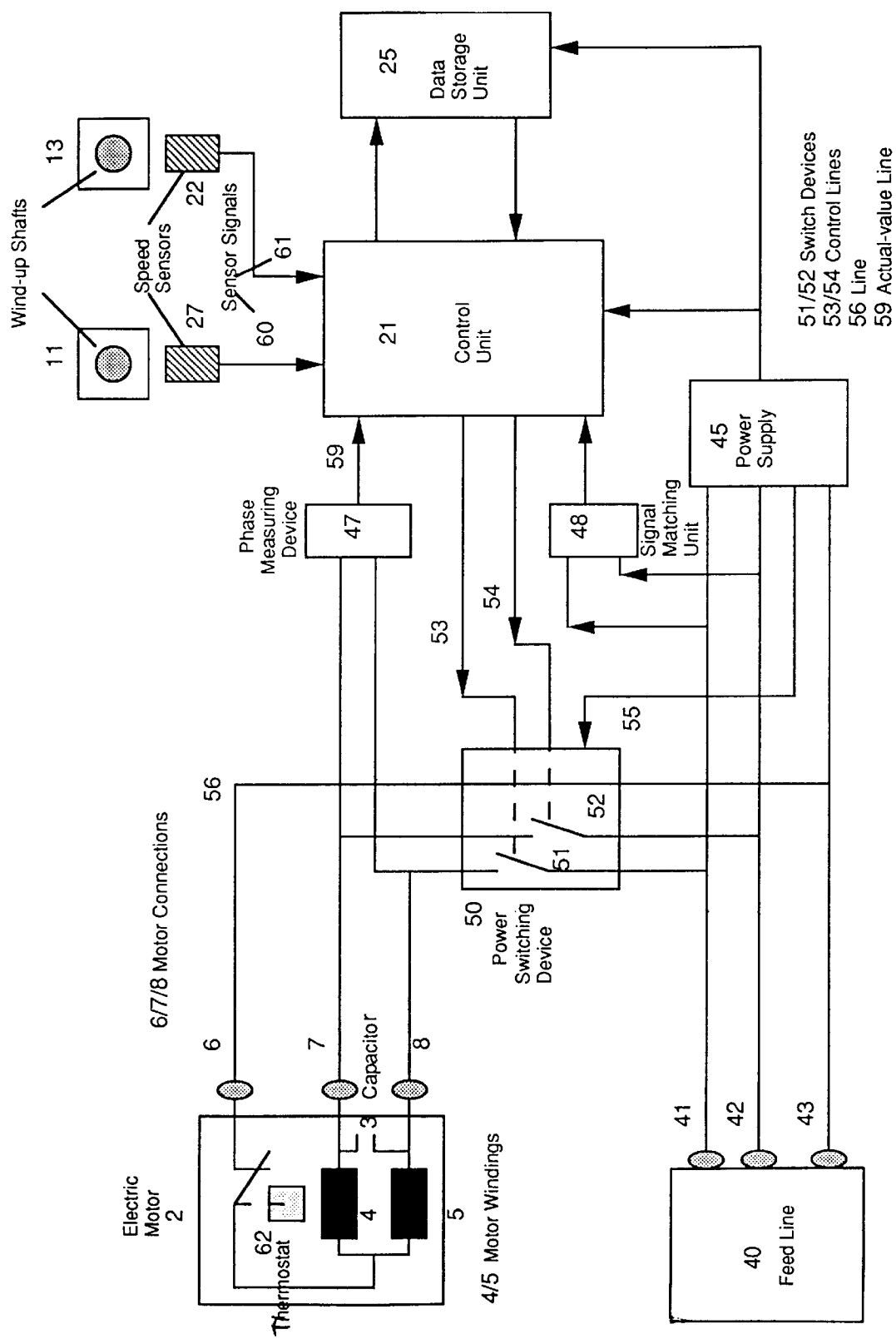

United States Patent

Wolfer et al.

[11] Patent Number: 5,850,131
[45] Date of Patent: Dec. 15, 1998

[54] PROCESS FOR DRIVING ELECTRIC MOTOR-OPERATED AWNINGS

[75] Inventors: Hermann Wolfer, Gutenberg; Dieter Walddoerfer, Unterlenningen, both of Germany

[73] Assignee: elero GmbH, Germany

[21] Appl. No.: 741,867

[22] Filed: Oct. 28, 1996

[30] Foreign Application Priority Data

Oct. 28, 1995 [DE] Germany ................ 195 40 302.9

[51] Int. Cl.[6] .............................. E06B 9/68; E04F 10/00
[52] U.S. Cl. ................................ 318/466; 318/430
[58] Field of Search .......................... 348/603, 608, 348/609, 626, 264, 265, 266, 286, 466, 468, 463, 430

[56] References Cited

U.S. PATENT DOCUMENTS

| | | | |
|---|---|---|---|
| 4,514,670 | 4/1985 | Fassel et al. | 318/467 |
| 4,730,152 | 3/1988 | Foust et al. | 318/603 |
| 5,038,087 | 8/1991 | Archer et al. | 318/469 |
| 5,204,592 | 4/1993 | Huyer | 318/466 |

FOREIGN PATENT DOCUMENTS

| | | |
|---|---|---|
| 3011706 C2 | 3/1980 | Germany. |
| 4402524 C1 | 1/1994 | Germany. |
| 4440449 A1 | 11/1994 | Germany. |

*Primary Examiner*—Bentsu Ro
*Attorney, Agent, or Firm*—Eugene E. Renz, Jr., PC

[57] ABSTRACT

By monitoring the load of the electric motor, it can be reliably determined when the electric motor runs up against a stop in the starting position of the awning, etc.

The electric motor turns off automatically and resets an internal counter. When the awning, etc., is being extended, a certain number of pulses is counted per rotation of the electric motor, and after a certain predetermined count value is reached, which indicates that the awning, etc., has arrived at end position, the electric motor is turned off. Because the counting device is reset in the starting position, the electric motor automatically compensates for any change which may have occurred in the length of the fabric of the awning, etc., the next time an actuation is carried out.

7 Claims, 3 Drawing Sheets

Functional Block Diagram

PROCESS FOR DRIVING ELECTRIC MOTOR-OPERATED AWNINGS

The invention pertains to a process for driving electric motor-operated awnings, etc., according to the introductory clause of claim 1.

In the case of electrically operated roller shutters, rolling gates, jalousies, awnings, movie screens, etc., it is known that adjustable mechanical limit switches can be used to set the desired end positions. Examples of drives of this type are known from DE 30 11 706 C2 and DE 44 02 524 C2. In these known drives, the drive shaft of the drive is held in an upper and a lower end position by way of so-called shaft limit switches.

DE 44 40 449 A1 describes a process for stopping these motorized drives electronically, so that the mechanical shaft limit switches can be omitted. The shut-off criterion in this process is the torque or the change in torque of the electric motor. The torque of the electric motor is detected continuously by electronic means whenever the motor is running, and the motor is turned off whenever the torque exceeds a predetermined value. To detect the torque, the phase shift of the current flowing through at least two motor windings is evaluated. A motorized drive for roller shutters or the like which operates according to this process is characterized by a very simple design and by the automatic detection of the end position. In addition, a drive of this type makes it possible to protect the roller shutter, etc., reliably from damage.

It has been found in practice, however, that problems occur especially when such drives are used to extend a piece of textile material, i.e., an awning, etc. The piece of fabric material to be wound up by the electric motor can stretch out over the course of time as a result of environmental influences. This leads to a situation in which this piece of fabric, which is now longer than it was before, sags undesirably after the drive has extended the material as far as it can. This often happens in the case of awnings which have been in use for a long time.

The invention is therefore based on the task of providing a process for driving motorized awnings, etc., in which the awning, etc., always travels exactly the same distance regardless of whether the textile material has stretched out or not. The drive is also intended to make superfluous the shaft limit switches required in the past.

This task is accomplished in the process cited above in that the load of the electric motor is monitored; in that a predetermined number of pulses is generated per rotation of the electric motor; in that, as the awning, etc., is being extended, the electric motor is turned off as soon as the predetermined number of pulses defining the end position has been counted by a counting device; and in that, as the awning is being retracted, the electric motor is turned off and the counting device reset as soon as a sudden change is detected in the load of the electric motor.

The process according to the invention is therefore based essentially on the idea of monitoring the load of the electric motor as a way of detecting when the electric motor runs up against a mechanical stop in the starting position of the awning, etc. By the command of a control unit, the electric motor is turned off automatically and the internal counter set back to zero. During motion in the opposite direction, i.e., when the awning, etc., is being extended, a certain number pulses is counted per rotation, and as soon as a programmable nominal value of pulses has been reached, i.e., the number which corresponds to the end position of the awning, etc., the electric motor is turned off. Because the counting device is reset, preferably reset to zero, when the awning, etc., reaches the stop and has thus returned to its starting position, the electric motor automatically compensates during the next movement for any change which may have occurred in the length of the fabric of the awning, etc.

Let us assume that, when the awning is installed, the value of the counting device at the stop, i.e., in the starting position of the awning, etc., is set to zero, and that the end position of the awning corresponds to a count value of, for example, 2,000. The electric motor now extends the awning from the starting position to the end position and then retracts the awning again when needed. During each of these operations, the count in the counting device always goes from zero to 2,000 and back again as long as the length of the fabric has not changed.

Let us now assume that the length of the awning fabric has increased for some reason, as a result of environmental influences, for example, and that the extended awning, for which the counting device stands at the previously specified counter value of 2,000, is retracted according to the process of the invention until the counter reaches a counter status of zero. Because of the increase in the length of the awning fabric, however, the motor can wind the awning fabric up beyond the counter status of zero until the electric motor runs up against the stop, which signifies that the awning has been completely wound up or retracted. This contact with the stop is detected by the control unit for the electric motor, at which point the counting device is reset again, that is, set back again to zero. The next time the awning is extended, the counter starts counting up from zero again exactly to the counter value of 2,000. As a result, even though the length of the fabric has changed, the awning is still extended again exactly to the proper distance so that there is no noticeable sag.

The process according to the invention is suitable especially for the driving of many different kinds of awnings (e.g., articulated arm awnings, cassette awnings, case awnings, building facade awnings, miniature awnings, drop arm awnings, and vertical awnings), movie screens, conservatory shades, etc. In addition, the process according to the invention is also suitable for driving motorized roller shutters, rolling gates, positive motion systems, hinged shutters, etc., whenever there is the fear that the length of the objects driven by these drives can undergo changes as a result of environmental influences, etc.

In a further elaboration of the invention, it is provided that the load monitoring, which preferably involves the monitoring of the torque of the electric motor, is masked out during the outward and inward journey of the awning, etc., and is activated only just before the awning, etc., reaches the starting position as it is being retracted. This has the advantage that a short discontinuity in the load, which might occur when a gust of wind, for example, strikes the awning, will not cause the electric motor to be turned off prematurely. By activating the load monitoring only just before the awning, etc., reaches its starting position, it is ensured that the counting device will be reset only when the awning contacts the stop in the starting position.

An especially simple way of detecting the load and thus the torque of the electric motor consists in evaluating the phase shift of the current flowing through phase windings of the electric motor. If the electric motor has at least two phase windings and a motor capacitor, the prevailing torque of the electric motor can be derived from the phase shift of the current flowing through these two phase windings. A small phase shift indicates a heavy load, whereas a large phase shift indicates a small load and thus low torque on the electric motor. A sudden change in the load, such as can be observed when the awning, etc., runs up against a stop upon reaching the starting position, is revealed by a significant change in the phase shift angle, which can be detected easily by the control unit and which defines the time at which the awning, etc., reaches it starting position.

Detecting the phase shift offers the advantage of eliminating the need for a separate sensor for detecting the rotational speed or torque. This results in a very simple design for the device for implementing the process according to the invention.

In a further elaboration of the invention, a monitoring device (watchdog circuit) is provided, which is triggered by the pulses generated by the rotation of the electric motor. The electric motor is thus also turned off when it is detected that the rotational speed has fallen below a predetermined value, at which time the data representing the distance traveled up to that moment are saved in a nonvolatile memory device such as an EEPROM. This ensures that the electric motor will also be turned off when it encounters an unexpected obstacle, but because the distance data, that is, the instantaneous status of the counter, and at least the count value defining the end position as well as preferably a control bit indicating the instantaneous rotational direction are filed in the nonvolatile memory device, the awning can be smoothly extended to its desired end position after the obstruction has been removed even if the electric motor has been turned off or even if the current has failed. This end position is also reached with precision, because the distance data valid at the time just before the obstruction was encountered are made available to the control unit from the nonvolatile memory.

It has been found advisable for a rotational direction block to be activated after the electric motor has been stopped. The rotational direction block ensures that, after the electric motor has been turned off, it can start up again only in the opposite direction with respect to how it was rotating immediately before being turned off.

The requirement for generating pulses as a function of the rotational movement of the electric motor can be satisfied in accordance with a further elaboration of the invention by allowing the electric motor to drive a magnet wheel, which, as it rotates, generates a sequence of pulses at the output of a sensor device, e.g., a Hall sensor, mounted near the wheel. As the number of pulses generated per rotation of the electric motor at the output of the sensor device increases, of course, so does the accuracy of the distance measurement.

An essential aspect of the process according to the invention is that the counter device is always reset, i.e., set back to zero, whenever the awning, etc., contacts the stop in the starting position, this being detected on the basis of the change in load. If, because of an obstruction located in its path, the awning is stopped during a retraction or extension process, the control unit will, of course, ensure that the power being supplied to the electric motor is cut off for safety reasons. In this case, however, the counting device is not reset; instead, the instantaneous status of the counter is saved in the nonvolatile memory device.

It is also of crucial importance to the process according to the invention that, regardless of what value the counter may have at the moment, the counter is always reset when the awning, etc., reaches its starting position and contacts the stop. Thus, if the fabric being wound up has increased in length as a result of environmental influences, it reaches the stop later than it did before. The next time the awning, etc., is extended, the electric motor covers this same distance from the stop again and thus compensates for the increase in length of the fabric. If for some reason the fabric to be wound up has become shorter, the process according to the invention provides that the stop is reached sooner. The counter will therefore has a value greater than zero, say, for example, a value of 15. Here, too, when the stop is reached, the counter is reset to zero, as a result of which, in the course of a subsequent extension, the electric motor again covers its programmed path and thus automatically compensates for the decrease in the length of the fabric. A decrease in the length of the fabric can be compensated because one or more extra turns of fabric are always provided on the awning axle when the awning is installed.

In another elaboration of the invention, it is provided that the awning, etc., is not allowed to contact the mechanical stop at the end of every return trip, i.e., every time the awning, etc., is retracted. This can be advantageous with respect to the mechanical stability of the stop or the tension cords of the awning, etc., because as a result these are subjected to less stress. Instead of the stop being contacted every time the awning is retracted, the retraction process is stopped just before the stop is actually reached on the basis of the approach of the counter value to zero. For example, retraction can be stopped at a counter value of, for example, 5. To prevent the two end points from drifting away from each other, a fixed addition value is defined in the stop direction, so that the electric motor executes several extensions and retractions before it runs up against the mechanical stop and then establishes new reference values for its end stopping point.

The electric motor accepts a reversal of direction preferably only when there has been at least a predetermined idle period between the control commands; this can be a period of, for example, 300 ms. If the command arrives before this time is up, the electric motor remains stationary; it will not respond until a new command arrives after the waiting period has expired. Power-on times which are shorter than, for example, 300 ms, are ignored by the electric motor, i.e., by the control unit. This ensures that the buffer energy required for the storage of the data in the nonvolatile memory is always present.

It is preferred that the drive for the awning, etc., be of the cylindrical plug-in type, the tube of the cylindrical drive containing not only the motor, the gearing, the motor capacitor, etc. but also the associated electronic control components for the drive. A plug-in cylindrical drive does not differ in a purely external sense from the conventional cylindrical plug-in type drives. Yet the often cumbersome job of adjusting the shaft limit switches, which a plug-in cylindrical drive of this type has always had in the past, can now be eliminated.

The process according to the invention for driving motorized awnings, etc., preferably offers various operating modes. In addition to a programming mode, which is used to enter the desired end position of the awning, etc., into the system, the process also has available a normal mode, in which the awning, etc., is extended and retracted. In addition, a correction mode can also be provided, in which the previously entered end position can be corrected. The end position of the awning, etc., is specified in programming mode. Here the awning, etc., is first pulled back into the starting position if it is not already there. In this starting position, the counting device is reset, and the awning, etc., is extended to the desired end position. The number of pulses counted during this operation defines the end position and is then stored in the nonvolatile memory.

Figure 2A:
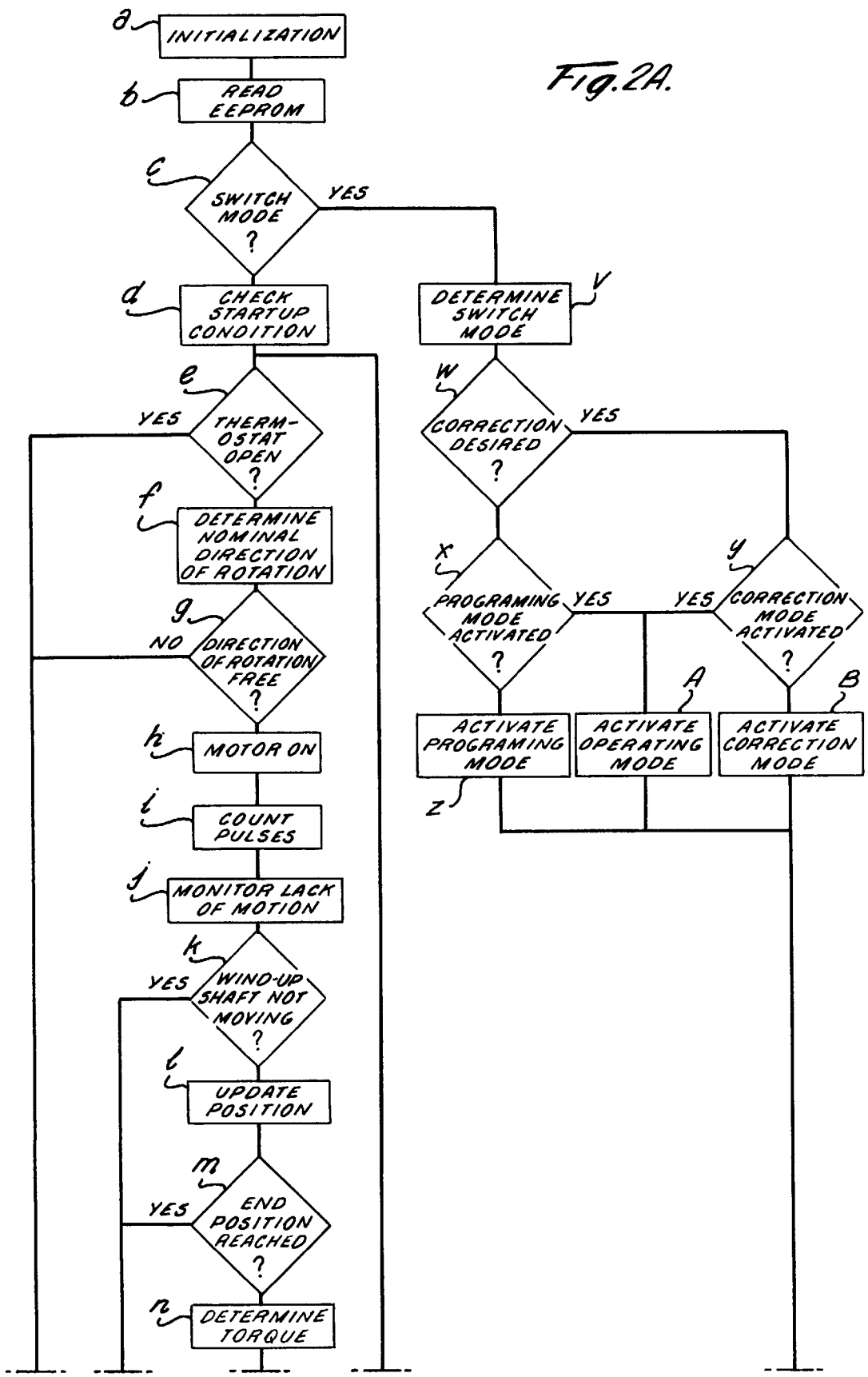
Figure 2B:
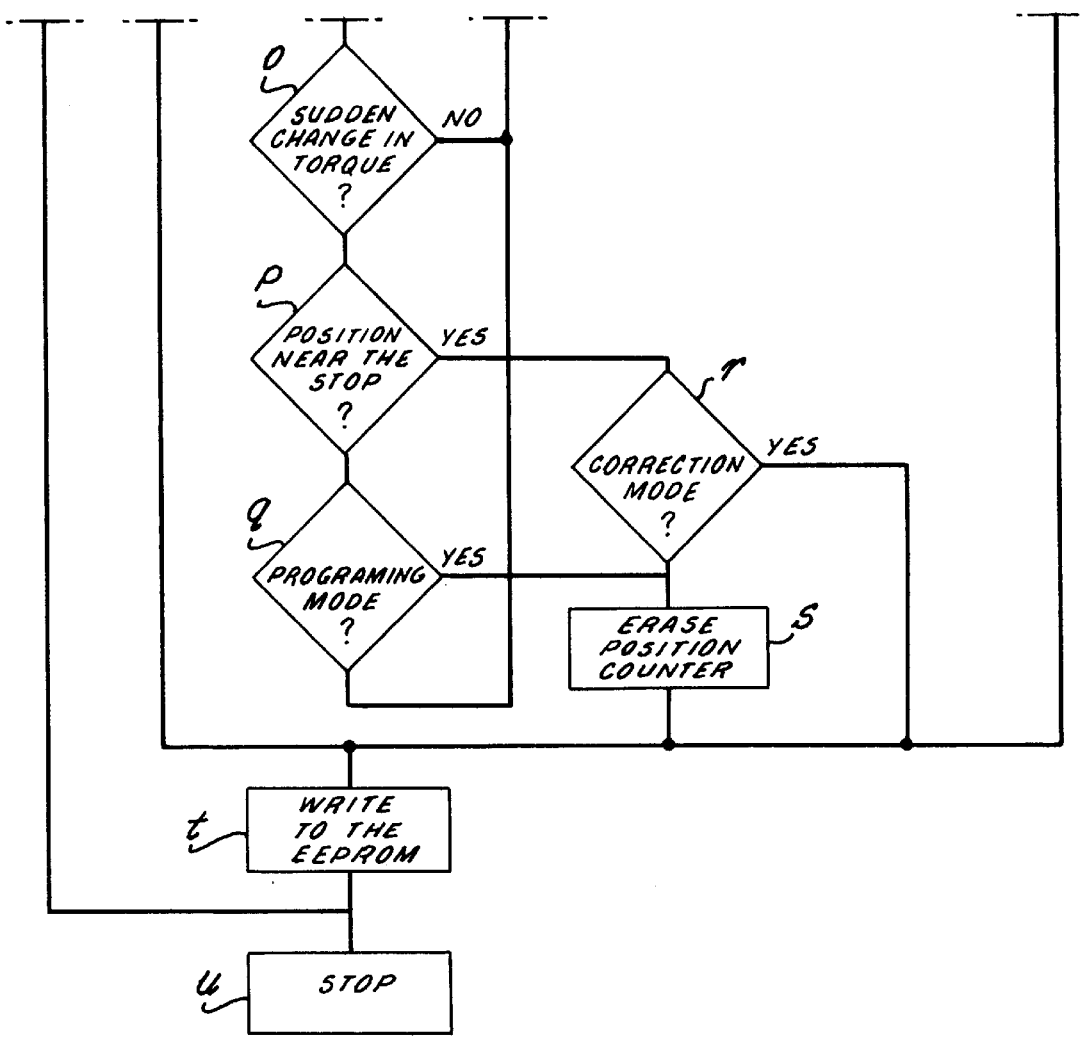

The invention is explained in greater detail below on the basis of an exemplary embodiment in conjunction with the figures:

FIG. 1 shows a funtional block diagram of a possible circuit for the operation of an electric motor, which controls an awning, etc.; and FIGS. 2A and 2B show a flow diagram, which describes how the funtional block diagram according to FIG. 1 works.

FIG. 1 shows a possible functional block diagram of the electronic system for actuating a drive, e.g., a cylindrical plug-in drive, for an awning, etc. This funtional block diagram does not differ from the functional block diagram of previously cited DE 44 40 449 A1. For the purpose of the present disclosure, explicit reference is herewith made to this publication. The design of the cylindrical plug-in drive described and shown in FIGS. 1 and 3 of the cited publication is also suitable in principle for the present invention. Nevertheless, in the case of a drive according to the present invention, the control unit operates in a different way, to be explained in greater detail in conjunction with FIG. 2.

As can be seen from FIG. 1, electric motor 2 has two motor windings 4, 5. They are connected to each other by one set of terminals and then by way of a motor thermostat 62 to a motor connection 6. The other two terminals of motor windings 4, 5 are connected to each other by way of a motor capacitor 3. The two terminals of this motor capacitor 3 are connected to two other motor connections 7, 8. Motor connections 6, 7, 8 are connected to feed terminals 41, 42, 43 of a feed line 40. With its terminals 41, 42, 43, feed line 40 provides the necessary current for electric motor 2 to rotate clockwise or counterclockwise. In the exemplary embodiment of FIG. 1, the phase for rotating clockwise is connected to feed terminal 41; the phase for turning counterclockwise is connected to feed terminal 42; and a neutral conductor is connected to feed terminal 43. Motor connection 6 is connected directly to feed terminal 43, whereas motor connections 7, 8 are connected to feed terminals 41, 42 by way of separate switching devices 51, 52. Switching devices 51, 52 are a component of a power switching unit 50. Switching devices 51, 52 can, for example, be relay switches. It is also possible for the circuit to be controlled by suitable semiconductor switches such as triacs or thyristors. The advantage of such semiconductor switches is the possibility of phase control, by means of which the nominal torque of electric motor 2 can be influenced in an effective manner to prevent the destruction of the driven object.

The advantage of connecting electric motor 2 to feed line 40 in this way consists in the absence of voltage at the motor connection for rotation in the opposite direction. If, for example, electric motor 2 is supposed turn clockwise, switching device 51 would close, whereas switching device 52 would be open. Because of the absence of voltage at one of feed terminals 41 or 42. it is possible to connect as many electric motors in parallel as desired. As a result, higher torques can be achieved and thus greater loads can be moved by the use of multiple cylindrical plug-in drives. Power switching device 50 is controlled by control signals, which are transmitted over control lines 53, 54 by a control unit 21. Control unit 21 is advisably a microcontroller or microprocessor connected to a nonvolatile data storage unit 25, which can be designed, for example, as an EEPROM. Signals from various sensors are sent to control unit 21, so that it can turn power switching device 50 and thus switching devices 51, 52 on and off by way of control lines 53, 54 as required. In the exemplary embodiment of FIG. 1, control unit 21 receives three sensor signals, namely, a sensor signal 59 for the actual value of the current torque load of electric motor 3; a sensor signal 60, which represents the rotational speed of electric motor 3; and a sensor signal 61, which is a measure of the rotational speed of wind-up shaft 13. Sensor signals 60, 61 are made available by suitable speed sensor devices 22, 27, such as Hall sensors. One of these sensor signals 60, 61 can, for example, be provided by a Hall sensor coupled to a magnet wheel, which is driven by electric motor 2. As it rotates, the wheel generates a sequence of pulses at the output of the Hall sensor; the interval between pulses is a direct measure of the rotational speed of the electric motor. In addition, the number of pulses in a continuous sequence is a direct measure of the distance traveled by the awning, etc., driven by electric motor 2.

It must be expressly pointed out in this context that, for the implementation of the process according to the invention, it is sufficient in principle to detect only the torque load of electric motor 2 and to make it available in the form of an actual-value signal 59. The other two sensor signals 60, 61 serve only to increase the reliability with which the electric motor can be turned off and are therefore redundant.

In the exemplary embodiment of FIG. 1, signal 59, which represents the actual torque load of electric motor 2, is made available by the use of a phase-difference measuring device 47. This phase difference measuring device 47, which is connected on the input side to motor connections 7, 8, detects the current flowing through the two motor windings 4, 5 and its phase shift. The phase shift is a measure of the instantaneous torque load of electric motor 2. There is therefore no need for a separate sensor to measure the torque, and thus the cumbersome job of attaching it to the drive shaft of electric motor 2 is eliminated.

Nevertheless, the process according to the invention is not limited to torque detection by means of phase difference measurement. On the contrary, the load of electric motor 2 can be detected by any suitable means. The only essential point is that a discontinuity or sudden change in the torque can be detected when the awning, etc., contacts a mechanical stop as it is being retracted or pulled back into the starting position.

A power supply unit 45 is also shown in FIG. 1, which is connected on the input side to feed line terminals 41, 42, 43 of feed line 40. Power supply unit 45 serves to supply current to nonvolatile memory 25, to control unit 21, and to power switching device 50. Finally, control unit 21 is connected to the two feed line terminals 41, 42 by way of a signal matching unit 48.

The way in which a drive of this type for awnings, etc., works is now explained on the basis of the flow diagram illustrated in FIGS. 2A and 2B.

After the power has been turned on, the supply voltage is applied to the circuit design shown in FIG. 1. An initialization is carried out first. As part of this initialization, the clock frequency for the microprocessor is set; data required for the operation of the processor are read in; and the input and output ports are defined. During initialization, therefore, the basic settings of the microprocessor of the control unit are established, so that the control unit can work properly thereafter. In the next step, control unit 21 requests data from nonvolatile data memory device 25. The distance data stored in data memory device 25 are thus read out. These distance data include a predetermined count value, which corresponds to the end position of the awning, etc., and which was arrived at in programming mode, which will be explained further on. The distance data also include the instantaneous count status of a counting device integrated advantageously into the control unit. The instantaneous count status of this counting device is a measure of the instantaneous position of the awning, etc. Thus control unit 21 reads data from nonvolatile memory 25 to determine were the awning is at that particular moment. In addition, data on the immediately preceding active direction of rotation, i.e., clockwise or counterclockwise, are also stored in nonvolatile memory. This is necessary so that, after electric motor 2 has been stopped, it cannot be restarted in the same direction.

In the next step, the program checks to see whether the mode currently selected should be changed. If not, the startup condition is tested, that is, whether it is possible for electric motor 2 to turn clockwise or counterclockwise. Then the program checks to see whether motor thermostat 62 shown in FIG. 1 is open or not. This therefore represents a form of temperature monitoring. If the operating temperature is within the permissible range, if therefore, the thermostat is closed, the program then determines the nominal direction of rotation of electric motor 2. In the next step, the program checks to see whether this determined nominal direction of rotation is in fact free. Only if this is so is the electric motor turned on, as a result of which it rotates in the selected direction.

Because electric motor 2 is coupled to a pulse generating device such as the magnet wheel and Hall sensor mentioned above, the rotation of the motor leads to a sequence of pulses. The frequency of these successive pulses is a measure of the rotational speed of the electric motor. The number of pulses is a direct measure of the distance traveled by the fabric of the awning, etc., driven by electric motor 2. In control unit 21, the pulses which are generated are added as the awning, etc., is being extended. The pulses are subtracted, however, when the awning, etc., is being retracted. The pulses can, for example, occur at intervals of 3.5 ms, at a given rotational speed of electric motor 2. If we assumed, for example, that the awning, etc., is in its starting position, the pulse counter will be at zero. If electric motor 2 now turns in such a way as to extend the awning, the counter status increases until a predetermined end position is reached at, for example, 2,000 pulses. As soon as the counting device detects the 2,000th pulse, electric motor 2 is turned off by control unit 21.

While electric motor 2 is turning in the specified direction and the pulses are being counted, a monitoring for absence of motion is carried out. This means that the system checks to see whether the awning, etc., has encountered an obstruction. If it has, electric motor 2 is turned off. To accomplish this, a monitoring device (watchdog circuit) is used. This monitoring device, which is inside the control unit and thus inside the microprocessor, is triggered by the output signal of the sensor device which generates the pulses representing the rotation of electric motor 2. When the rotational speed of the magnet wheel and thus of the rotational speed drops below predetermined value, e.g., in the absence of motion, the electric motor is turned off and the instantaneous distance data are saved in nonvolatile memory 25. When electric motor 2 and thus the wind-up shaft attached to it stop turning, the instantaneous distance data are written into the EEPROM and then the electric motor is turned off.

As long as no obstruction is encountered, the winding shaft attached to electric motor 2 continues to turn. In this case, its position is continuously updated; that is, the count status of the counting device is increased by the continuously recurring pulses. This continues until the predetermined end position is reached, such as at a count status of 2,000. As soon as this end position is reached, electric motor 2 is turned off.

Let us assume that the awning has thus reached its end position, i.e., that is has been completely extended. When the awning, etc. is now retracted from this end position, the program checks again to see whether motor thermostat 62 is open or not. Then the nominal direction of rotation is determined, and the system checks to see whether this direction is free. In the next step, the motor is turned on to retract the awning, etc., the direction of rotation being the opposite of that in which the awning, etc. was extended. This time the pulses are counted backwards under simultaneous monitoring for the absence of motion. Because an end position represented by a count status of, for example, 2,000, is not reached when the awning, etc., is being retracted, the torque of electric motor 2 is detected instead. When a sudden change occurs in the torque and the awning is close to the stop, the status of the counting device is reset or erased and thus set back to zero as long as correction mode has not been activated. The EEPROM accepts this new count value as input, and then the motor is turned off. If there is no sudden change in the torque value, then according to FIGS. 2A and 2B, control unit 21 jumps back to the point in the process just after the test of the startup condition.

If, in the event of a sudden change in the torque values, the awning, etc., is not near the mechanical stop in the starting position, control unit 21 checks to see whether the system is in programming mode. If not, the program jumps to point just after the test of the startup condition. If the system is in programming mode, in the next step the counting device is reset; these data are written into the EEPROM; and the motor is turned off.

As can be seen from the flow chart of FIGS. 2A and 2B, if the program receives a positive answer when it checks to see whether the mode should be switched, it proceeds to determine the mode. Control unit 21 checks first to see if a correction is desired. If so, another check is made to determine whether or not correction mode has been activated. If not, correction mode is activated; the data are written into the EEPROM; and electric motor 2 is turned off. If correction mode is already active, operating mode is activated, and then the data are written to the EEPROM and electric motor 2 is turned off. If no correction is desired, the program then asks whether programming mode has been activated. If so, operating mode is activated. If not, programming mode is activated.

The two most important modes of the operation of the electric motor 2 are programming mode and normal mode. Programming mode serves to subject the electric motor and the control unit to a learning process, so that the awning, etc., is always extended to exactly the same end position, regardless of whether the fabric of the awning, etc., to be wound out or in has decreased or increased in length as a result of external influences. In normal mode, the awning is brought to this previously programmed end position.

The operating state of programming mode is preferably indicated by a brief jerk each time the system is turned on. For programming mode, the electric motor is first actuated in such a way that the awning, etc., is at the stop and therefore in its starting position. Once the electric motor is at the stop, current, for example, can be applied briefly to the two control lines of the electric motor to shift it into programming mode. In this programming mode, it is possible for the electric motor to be driven to any desired position. Once this position has been reached, current is sent again through the two control lines to save in nonvolatile memory, that is, in the EEPROM, the corresponding status of the counter, which has counted the pulses associated with the rotational movement of the motor. In normal mode, the drive then traverses the distance from the stop to the programmed end position defined by the predetermined count status. During the return trip, the load, i.e., torque, monitoring process is preferably masked out and reactivated only just before the stop is reached. This as the advantage that a short discontinuity in the torque, such as that which can occur when, for example, a gust of wind or the like strikes the awning, etc., cannot cause the electric motor to be turned off prematurely. If the electric motor nevertheless should become blocked by an obstacle for a second, for example, it is possible for the system to register the occurrence of a malfunction as a result of the absence of pulses, as a result of which the motor is also turned off, although in this case the counter is not reset. It is therefore possible for the awning to continue to move in the same direction.

Nevertheless, when the awning runs up against the stop in the starting position, the count value of the counter is always set back regardless of its actual value. This ensures that, regardless of the stretching or shrinking of the fabric, the awning, etc., will always be extended to exactly the same end position. For the sake of the mechanical stability of the stop or tension cords of the awning, etc., it can be advantageous for the awning, etc., not to run up actually against the stop each time the awning is retracted. Instead, the count value can be used to stop the awning just before it actually reaches the stop. To prevent the two end points from drifting, preferably a fixed addition value is specified in the direction of the stop, so that the electric motor performs several extensions and retractions before actually contacting the stop and newly differentiating its end stopping point.

The electric motor is preferably provided with a driver ring, which drives a magnet wheel. When this wheel rotates, it generates a certain pulse sequence at a sensor mounted under the magnet wheel, which can be, for example, is the Hall sensor mentioned previously. The pauses between the pulses are proportional to the rotational speed of the wind-up shaft driver ring and thus a function of the movement of the driven awning, etc. The pauses between the magnet wheel signals trigger a monitoring process, which proceeds in the microprocessor of the control unit. The monitoring time expires as the driver ring is turning very slowly or not at all. The motor is then turned off and the direction of rotation in question is blocked. In addition, the data are written into nonvolatile memory. If a rotational direction block is in effect, the electric motor can run only in the opposite direction. After a few flank alternations of the magnet wheel signal in the opposite direction, the previously blocked rotational direction is preferably released again. The motor accepts a reversal of direction only if at least 300 ms of no movement occurs between the control commands. If this much time has not elapsed, the motor remains stationary until a new command arrives after the waiting period is over. A power-on time which is shorter than, for example, 300 ms, is ignored by the electric motor. This guarantees that the buffer energy required for storing the data is always present.

If the electric motor is installed in an awning, the drive operates in the following way, under the assumption that two switches are available. One switch is provided with label which tells the user that the actuation of this switch will retract the awning, etc. The other switch is provided with a label which tells the user the awning, etc., will be extended. When the retraction switch is actuated, the electric motor draws the awning, etc., in. Now it is possible to switch to programing mode, which can be activated by, for example, pressing simultaneously on both switches for a short period of time. Then programming mode is active. When the extension switch is now actuated, the awning, etc., starts up with a jerk and is then extended until it reaches the position desired by the user, i.e., the position where the awning, etc., is supposed to stop. This position is saved when the user actuates both switches simultaneously again. Control unit 21 thus knows that programming mode has ended.

When the user then presses on the retraction switch, the awning, etc., starts moving without a jerk, and the drive (and thus the awning) move back to the starting position. in this starting position, the electric motor or the awning contact a stop, which is detected by the control unit, as explained, on the basis of the occurrence of a sudden change in the load. When the user wants to extend the awning again, he actuates the appropriate switch. The awning, etc., starts moving without a jerk, and the drive runs until the awning has reached the previously programmed position.

The end position can be reprogrammed at any time by repeating these steps.

By means of a correction mode, a position change can also be achieved within predetermined limits by means of a specific sequence of actuations of the "Extend" control button after the awning, etc., has been extended. Here, too, the change of mode is indicated by a short jerk at the time of startup.

We claim:

1. A system for automatically compensating for dimensional changes in driven devices, operated by electric motors wherein the motor actuates the driven device in a extension cycle from a starting position to an end position and in a retraction cycle from the end position to the starting position, comprising:

means for counting the pulses generated by the motor during the extension cycle;

means for deactivating the motor as soon as a predetermined number of pulses defining the end position has been counted;

means for reactivating the motor for the retraction cycle;

means for monitoring motor load during the retraction cycle and deactivating the motor when the motor load reaches a predetermined level; and means for resetting the pulse counting means when the load of the motor reaches said predetermined level.

2. A system according to claim 1, wherein the load monitoring is masked out during the extension and retraction cycle and is activated again only just before the driven device reaches the starting position.

3. A system according to claim 1, wherein the rotation of the electric motor during the extension and retraction cycle is monitored, and wherein the electric motor is deactivated without resetting the counting means if no motion occurs for a predetermined length of time as a result of external mechanical effects acting on the driven device.

4. A system according to claim 1, including a speed sensor device for measuring angular speed of the motor and having means for deactivating the motor when the angular speed drops below a predetermined value and where the instantaneous distance traveled is saved in memory.

5. A system according to claim 1, wherein after the electric motor has been deactivated, it can start up again only in the opposite direction with respect to how it was rotating just before it was deactivated.

6. A method for automatically compensating for dimensional changes in driven mechanisms, which are motor-driven from a starting position through an extension cycle to an end position and in a retraction cycle activated from the extended end position back to the starting position, consisting of the steps of:

counting motor pulses starting from zero during the extension cycle by a pulse counting means;

deactivating the motor when a predetermined number of pulses defining the end position has been reached during the extension cycle;

reactivating the motor to initiate a retraction cycle and during the retraction cycle measuring the motor-current phase shift to determine motor load;

deactivating the motor when the motor load reaches a predetermined level; and resetting the pulse counting means to zero when the load of the motor reaches said predetermined load whereby the motor automatically compensates during the next cycle for any dimensional changes in the driven mechanism.

7. A system for automatically compensating for dimensional changes in driven devices, operated by electric motors wherein the motor actuates the driven device in a extension cycle from a starting position to an end position and in a retraction cycle from the end position to the starting position, comprising:

means for counting the pulses generated by the motor during the extension cycle;

means for deactivating the motor as soon as a predetermined number of pulses defining the end position has been counted;

means for reactivating the motor for the retraction cycle;

means for monitoring motor load during the retraction cycle and deactivating the motor when the motor load reaches a predetermined level;

means for resetting the pulse counting means when the load of the motor reaches said predetermined level; and means for monitoring torque of the electric motor and masking it out during the extension and retraction cycles and activating it just before the driven device reaches the start position as it is being retracted.

* * * * *